I. N. Stanley,
Gas Machine.
No. 111,486. Patented Jan. 31, 1871.
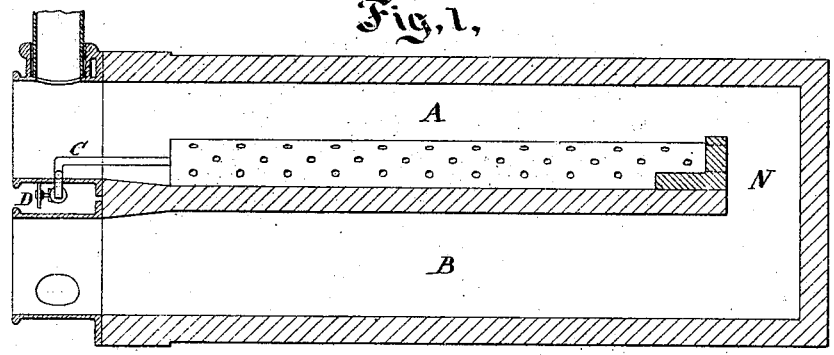
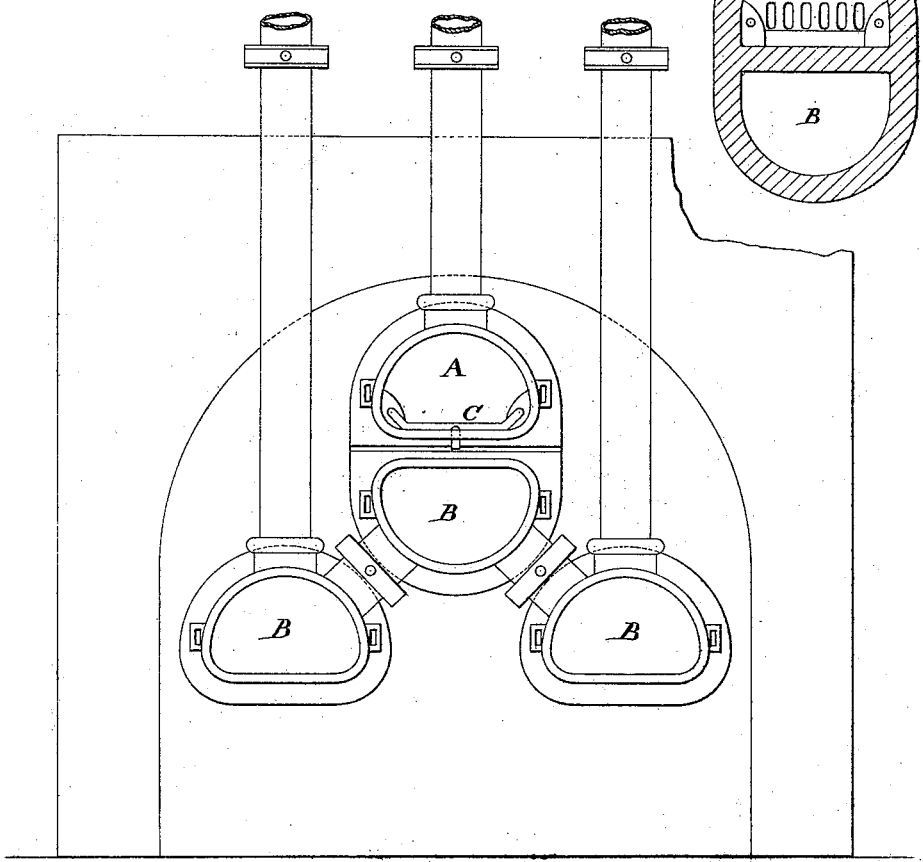

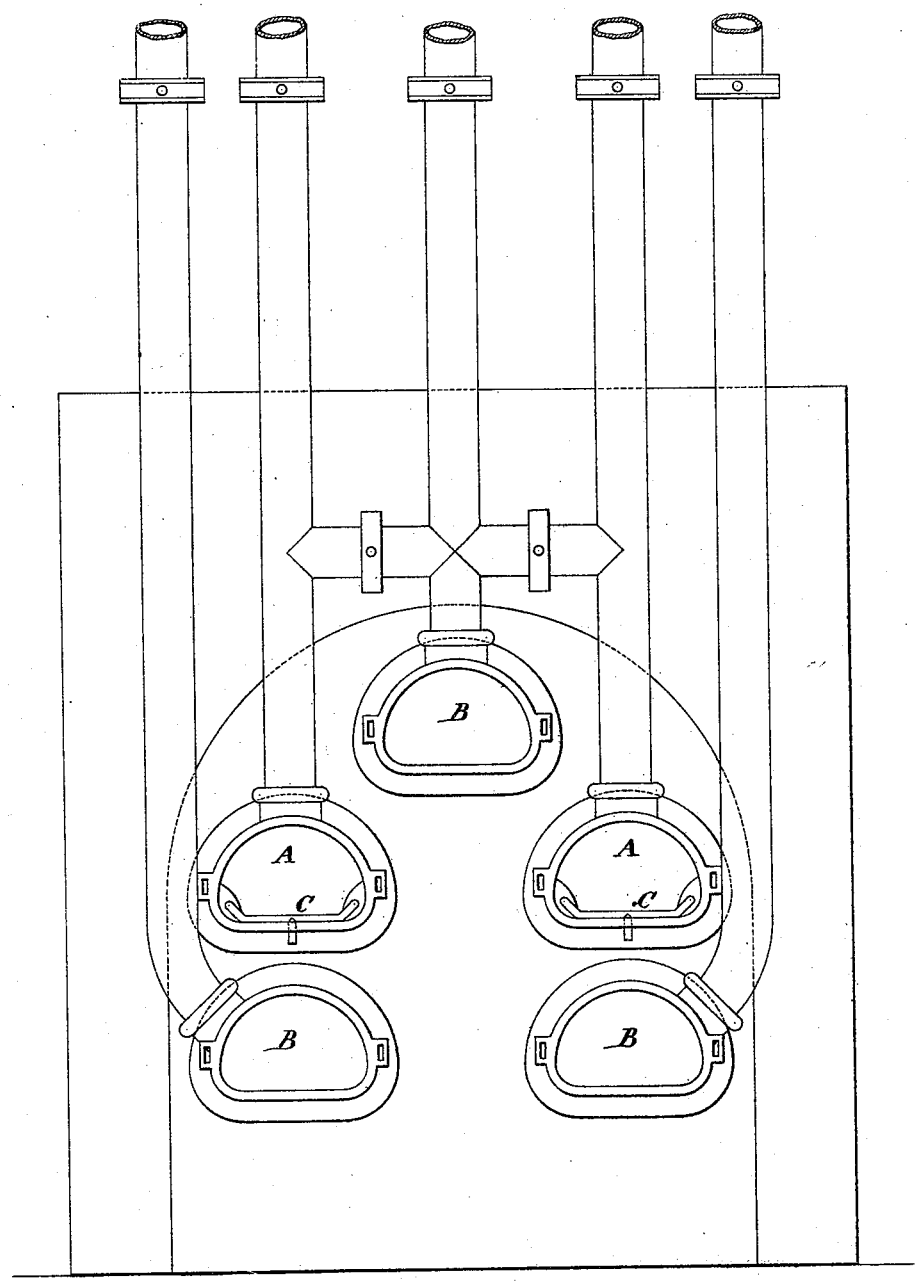

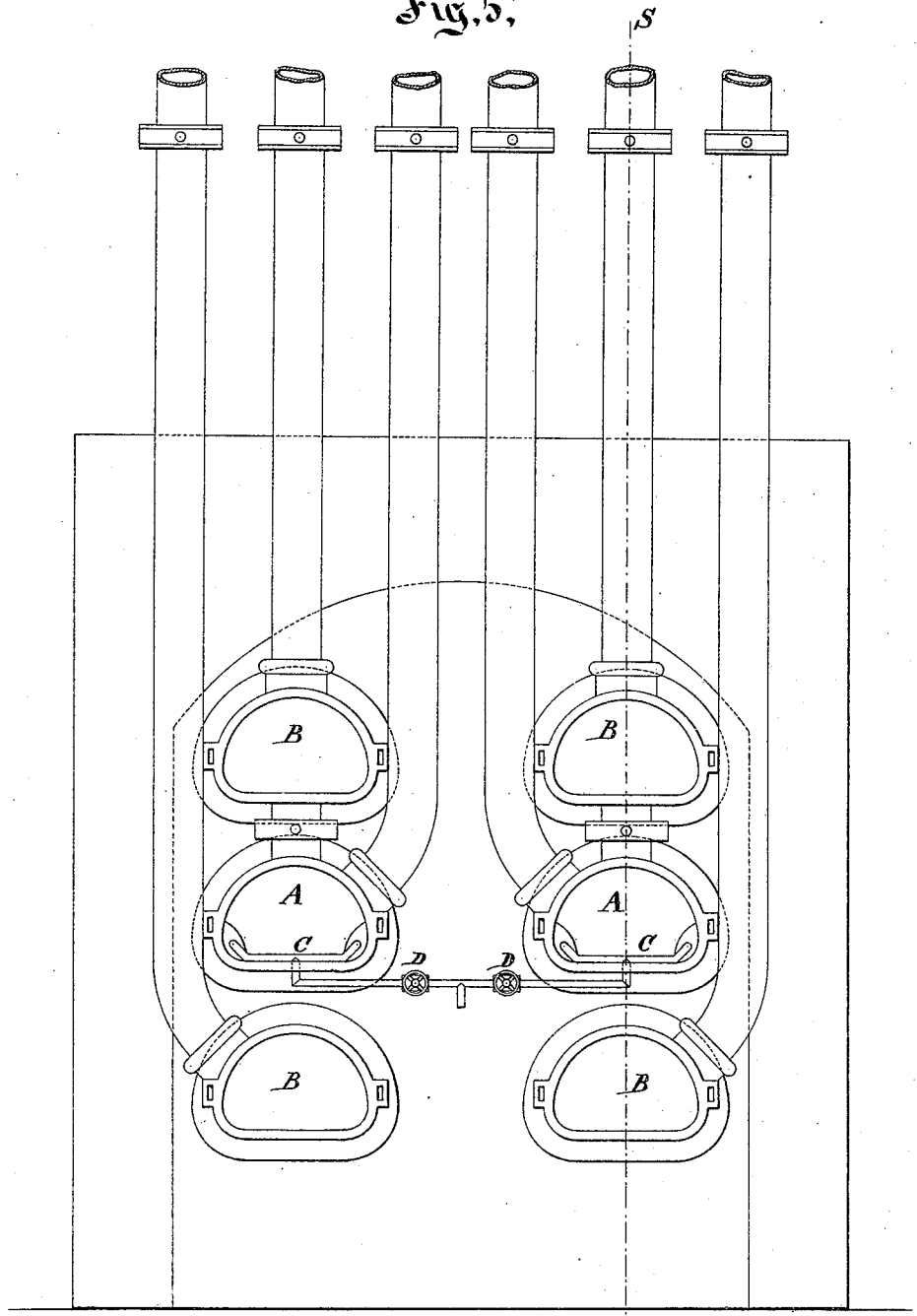

*I. N. Stanley,*
Gas Machine.
No. 111,486. Patented Jan. 31, 1871.
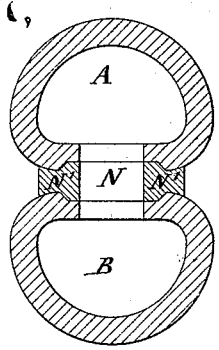
Fig. 7.
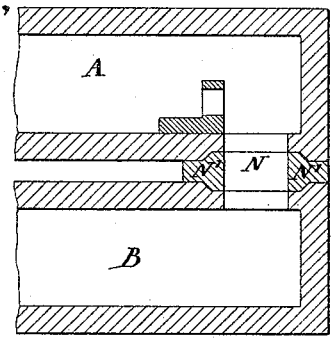
Fig. 8.
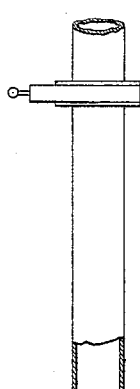
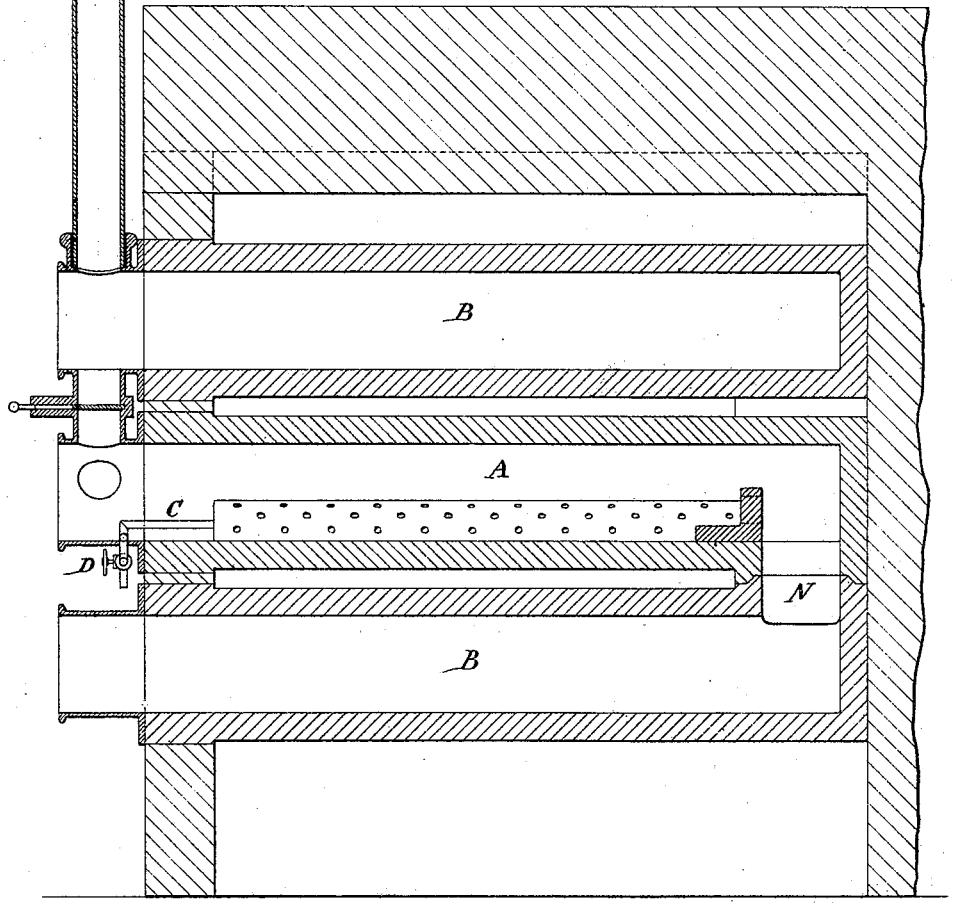
Fig. 6.
Witnesses, A. Hoermann, C. C. Livings
Inventor, Ira N. Stanley

United States Patent Office.

IRA N. STANLEY, OF BROOKLYN, NEW YORK.

Letters Patent No. 111,486, dated January 31, 1871.

IMPROVEMENT IN THE MANUFACTURE OF ILLUMINATING-GAS.

The Schedule referred to in these Letters Patent and making part of the same.

*To all whom it may concern:*

Be it known that I, IRA N. STANLEY, of Brooklyn, in the county of Kings, in the State of New York, have invented certain new and useful Improvements in the Method of Manufacturing what is known as Gwynne's, Harris', Saunders', Stevens', and other Hydrocarbon Gas, by which term I mean illuminating gas, composed of the volatile portions of bituminous coal, mingled with hydrogen, produced by the decomposition of water.

I introduce steam in a retort containing any suitable fuel or oxygen-absorbing material, at a high temperature, and the steam being decomposed yields its oxygen to combine with the carbon of the fuel, while the hydrogen flows away to be subsequently used. This, so far, has been done before, but while, as the process has been heretofore conducted, the hydrogen has been mingled with the coal-gas at a period after both have been formed and led through passages independently, the union has, from this cause, been imperfect, and a very serious evil has been experienced in a rapid destruction of the retort in which the hydrogen has been formed.

It appears that, for reasons which it is not necessary to go into here, the presence of coal-gas in a retort tends to preserve it from destruction. If a retort is left empty while exposed to the high temperature required in the manufacture of gas, it becomes rapidly cracked and destroyed; while if properly supplied with bituminous coal, and, consequently, yielding the ordinary coal-gas in liberal quantities, no such destruction is experienced. The decomposing-retort, in the production of hydrogen, is in a condition corresponding to the empty retort above. There is no coal-gas within it to preserve it. Sometimes the coal-gas has been let into the mouth of the hydrogen-retort, but always in immediate proximity to the pipe through which the gas flows away from the same.

My invention provides for circulating coal-gas through the whole length of the hydrogen-retort. The coal-gas, by its presence, preserves the hydrogen-retort from destruction, and, also, is more efficiently mingled with the hydrogen gas by being present at the moment of its liberation. I find, by experiment, both that the hydrogen-retorts are better preserved, and that the resulting gas is better mixed and of a better quality.

I will proceed to describe what I consider the best means of carrying out my invention.

The accompanying drawing forms a part of this specification.

Figure 1 is a central longitudinal section through portions of the apparatus, which I denominate a hydrogen-chamber, and a coal-gas chamber.

Figure 2 is a vertical cross-section of the same.

Figure 3 is a front view, showing the front end of the same, and also of two other retorts, which are used for the manufacture of coal-gas, and are connected therewith in the same bench.

Figure 4 is a front view of a bench of five retorts, connected so as to be operated according to my invention.

Figure 5 is a front view of a bench of six retorts, correspondingly connected.

Figure 6 is a vertical section on the line S S in fig. 5.

The drawing represents the novel parts with so much of the ordinary parts as is necessary to indicate their relations thereto.

It will be understood that there is a grate and other suitable provisions for firing below the retorts, and ordinary or suitable provisions for supplying steam to the hydrogen-retorts, and for receiving, storing, washing, &c., the gases discharged.

In order to describe all the drawing together I may add that figs. 7 and 8 show a modification of the manner of constructing the double retort shown in figs. 1 and 2.

Figure 7 is a cross-section, and

Figure 8 is a central longitudinal section of the back portion.

Similar letters of reference indicate corresponding parts in all the figures.

A is is the hydrogen-chamber, and

B is the bituminous-coal chamber.

The apparatus for supplying steam to the hydrogen-chamber is indicated by C.

The inclosing walls may be of good fire-clay, or other suitable material, and the provisions for charging each chamber, and for properly opening and closing and luting the mouth of each chamber may be of any ordinary or suitable character.

The cock which controls the admission of steam to the hydrogen-chamber is marked D.

N is a connection between the coal-gas chamber B and the hydrogen-chamber A. It is at the end of the chamber furthest from the eduction-passage, and the arrangement allows the coal-gas from the chamber B to flow the entire length of the hydrogen-chamber A before it can find its exit into the proper stand-pipe and be discharged.

The coal-gas chamber B is charged with bituminous coal in the ordinary manner. The hydrogen-chamber A is charged with coke, charcoal, or other suitable decomposing material. A small quantity of bituminous coal is also deposited in that chamber. I attach much importance to this provision.

The bituminous coal may be mingled, with some success with the other material, but I prefer to place it in a thin stratum or layer beneath the other. In either position, it gives off its gas in such close proximity to the hydrogen (evolved by the absorption of the oxygen) that the mingling of the coal-gas with the hydrogen is very completely effected; and the presence of the coal-gas from this source may contribute, in the manner above referred to, to preserve the hydrogen-retort.

The presence of coal-gas in the hydrogen-retort may be made sufficient by this latter means to go far to preserve and make durable the material of the hydrogen-retort, and so, also, the hydrogen-retort may be efficiently preserved, and the intimacy of the mingling may be promoted, by simply the presence of the coal-gas from the other chamber, and its being made to traverse the whole length of the hydrogen-retort, as described; but I prefer both provisions together, as specified.

Referring to figs. 1, 2, and 3, where the two chambers A and B are in the same structure, the upper portion of the structure or compound retort I term the hydrogen-retort; and the lower portion I term the coal-gas retort. I use these terms whenever they are referred to as retorts, but I will endeavor to give the preference to the term chambers as applied to these parts of the apparatus, so that it will apply equally to the cases where they are, as, in this instance, formed together in a single vessel, and to the other cases where they are formed in separate vessels.

Referring to figs. 4 and 5, &c., the chambers or retorts are made entirely in separate pieces. The chambers and their connections are designated, as far as practicable, by the same letters as before; but there are valves, by means of which the passage of the gas through the passages can be stopped and opened at pleasure.

By means of these valves I can discharge the coal-gas from one coal-gas retort into the back end of the hydrogen-retort for a certain period, and then can close off that coal-gas retort, and open the passage from another, which has been more recently charged with bituminous coal, and, consequently, deliver its gas in more liberal quantities. The same general arrangement for this purpose is shown in the modification, fig. 4, having five retorts, and in the modification, figs. 5 and 6, having six retorts.

In figs. 7 and 8 I use for the double retort two ordinary single retorts, the lowermost being inverted, and the two being a little separated throughout, except at the point of communication at the back.

The connection is made by means of a saddle, $N^1$, which is or may be of similar clay to the bodies of the retorts, and made tight by mastic joints. The retorts may be formed, for the special purpose, with holes for the connection, or I can employ common close retorts, with little labor or disadvantage, by simply cutting out suitable holes for the flow of the gas, and properly recessing or sinking the surfaces adjacent to connect well to the saddle.

In the form of apparatus shown in figs. 1 and 2, I can, if preferred, make the middle partition separate from the walls, and cement it in place on suitable shelves, or in suitable grooves. If no cement is applied the joints will soon become stopped with gas-carbon.

In order to reduce the chance of the passage N becoming stopped with gas-carbon, it should be made as large as may be. I propose, in some cases, to make it as large as the whole cross area of the several chambers.

Although I have spoken only of bituminous coal as the material from which the gas is produced, I propose to use oils, resin, jets, bituminous shales, and any gas-producing materials, solid or liquid.

In fig. 6 I have shown another construction of the double retort, where it is made in two pieces, with short necks, adapted to match into each other with cement.

In each case, it will be observed that, the gas from a coal-gas retort is always passing through the whole length of the hydrogen-retort. I prefer to work the valves in these connections so that, supposing a charge of bituminous coal to be completely coked in four hours, the gas therefrom will, during the first two hours, be delivered through the hydrogen-retort, and during the last two hours will be delivered directly, through another provision. During the closing portion of this latter period the retort is emptied of coke and recharged. So soon as the gas commences to be generated in liberal quantities, it is turned into and circulated through the hydrogen-retort, and the other retort, which has been in the interim supplying the hydrogen-retort, is now in its turn shut off to be similarly treated during the next two hours.

I claim as my invention—

1. The process of presenting coal-gas to the hydrogen-producing material in the hydrogen-chamber A, so that the coal-gas shall be in contact with the hydrogen at the moment of its evolution at a high temperature, and shall thereby combine more perfectly therewith, and also preserve the walls of the hydrogen-chamber A, as specified.

2. The process of conducting coal-gas through the entire length of the hydrogen-retort, as and for the purposes specified.

3. The chambers A B and connections N, for the above process, when made in two separate retorts, necked and cemented together, as specified.

In testimony whereof I have hereunto set my name in presence of two subscribing witnesses.

IRA N. STANLEY.

Witnesses:
THOMAS D. STETSON,
C. C. LIVINGS.